United States Patent
Randall (10) Patent No.: US 6,809,441 B2
(45) Date of Patent: Oct. 26, 2004

(54) COOLING OF ELECTRICAL MACHINES (75) Inventor: Steven Paul Randall, Leeds (GB)

(73) Assignee: Switched Reluctance Drives Ltd., Harrogate (GB)

( * ) Notice: Subject to any disclaimer, the term of this patent is extended or adjusted under 35 U.S.C. 154(b) by 106 days.

(21) Appl. No.: 10/137,811

(22) Filed: May 1, 2002

(65) Prior Publication Data

US 2002/0167232 A1 Nov. 14, 2002

(30) Foreign Application Priority Data

May 11, 2001 (GB) .............................................. 0111629

(51) Int. Cl.[7] .............................................. H02K 9/00
(52) U.S. Cl. .......................................... 310/54; 310/52
(58) Field of Search .............................. 310/52, 54, 64, 310/58

(56) References Cited

U.S. PATENT DOCUMENTS

| 4,409,502 A | * | 10/1983 | McCabria ..................... 310/61 |
| 5,072,146 A | * | 12/1991 | New ........................ 310/90.5 |
| 5,140,204 A | * | 8/1992 | Cashmore et al. ............ 310/61 |
| 5,489,810 A | | 2/1996 | Ferreira et al. ............. 310/6 K |
| 5,808,387 A | * | 9/1998 | Akachi et al. ................ 310/54 |
| 5,859,482 A | * | 1/1999 | Crowell et al. ............... 310/58 |
| 5,903,073 A | | 5/1999 | Mukai ....................... 310/5 K |

FOREIGN PATENT DOCUMENTS

| EP | 0823771 A1 | 2/1998 | .......... H02K/21/16 |
| WO | WO 00/01053 | 1/2000 | ............ H02K/3/24 |

OTHER PUBLICATIONS

Stephenson, et al., "The Characteristics, Design and Applications of Switched Reluctance Motors and Drives," PCIM '93, Nürnberg, Germany, Conference & Exhibition, Jun. 21–24, 1993, pp. 1–68.

* cited by examiner

Primary Examiner—Dang Le
Assistant Examiner—Nguyen N Hanh
(74) Attorney, Agent, or Firm—Dicke, Billig & Czaja, PLLC (57) ABSTRACT A cooling system for an electrical machine includes at least one set of heat-conducting inserts positioned so as to transmit heat from at least one part of the winding in the stator to a heatsink. The heatsink may be the frame of the machine itself, but could also be a coolant pipe mounted at one or both ends of the stator. One form of insert is arranged between windings to draw heat away from the sides of the poles. Another form of insert is arranged on the ends of the poles to draw heat from that region.

11 Claims, 7 Drawing Sheets

COOLING OF ELECTRICAL MACHINES

CROSS REFERENCE TO RELATED APPLICATION

The subject matter of this application is related to the subject matter of British Application No. 0111629.2, filed May 11, 2001, priority to which is claimed under 35 U.S.C. 119 and which is incorporated herein by reference.

BACKGROUND OF THE INVENTION

1. Field of the Invention

This invention relates to the cooling of electrical machines.

2. Description of Related Art

Electrical machines typically have windings made from insulated conductors in which current flows and which, unless the conductor material is super conducting, have resistive loss. This resistive loss (the so-called $I^2R$ loss) heats up the conductor. The continuous rating of the electrical machine generally depends on the temperature limit of the insulation material of the winding. Often these limits conform to internationally recognized values, e.g. Class F (145° C.), Class H (180° C.) etc., and the expertise of the designer is brought to bear on the problem of removing the $I^2R$ loss so as to keep the temperature of the winding below the chosen limit.

The problem is made more difficult because of the generally conflicting requirements to provide good electrical insulation and good thermal conduction. The conductors of the winding are typically coated with an insulating enamel, and the completed winding assembly is typically impregnated with an encapsulating varnish. These measures contribute to ensuring that the electrical insulation of the winding is of a high quality. However, most good electrical insulators are also good thermal insulators, so the use of these materials generally makes more difficult the task of providing paths of high thermal conductivity for the $I^2R$ loss from the winding to a heat sink where the loss may be dissipated.

The problem of heat removal is further compounded on electrical machines which have windings in which a coil spans a single tooth, for example brushless dc machines and switched reluctance machines. While the coils of a conventional distributed winding are generally dispersed across a relatively large number of slots and have more intimate contact with the iron of the stator laminations, the short-pitched windings of a salient pole machine generally contact the stator only on two sides of the coil, leading to a heat-removal path of a smaller cross-sectional area.

Various methods are known for improving the efficiency of the dissipation path for the heat in the winding. For example, the coating of encapsulation varnish is sometimes made very thick, so as to eliminate virtually all the air pockets around the winding and provide a path through the varnish for the heat. This improves the heat transfer, but is often a messy and time-consuming process, involving the use of compounds which constitute health and safety hazards.

Figure 1:
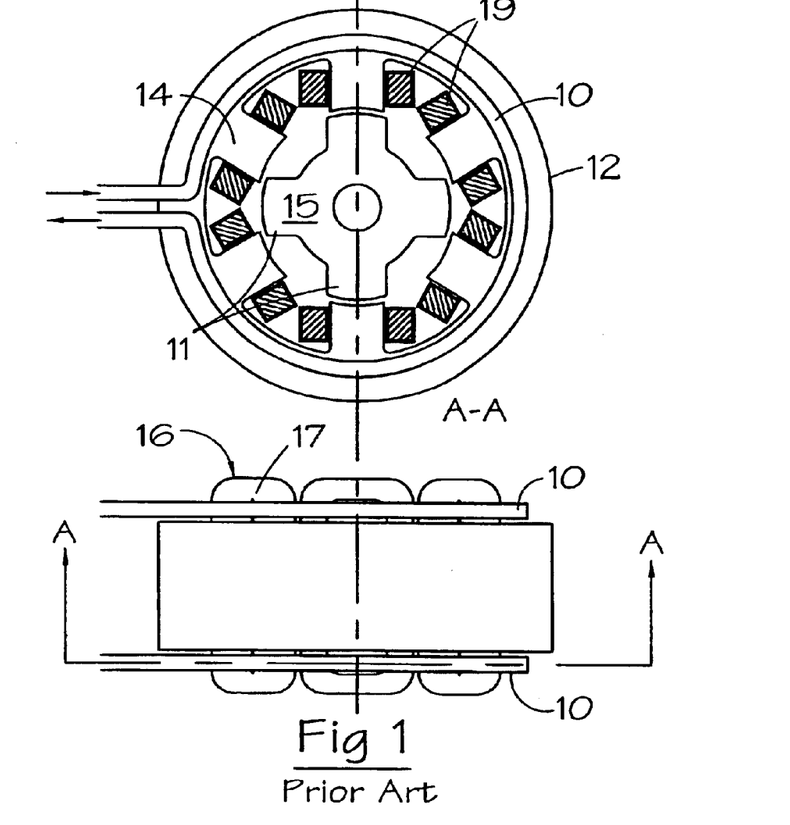
FIG. 1 is a prior art liquid cooled stator.

Liquid cooling has also been proposed. The liquid flow rate can be set to keep the liquid at a relatively low temperature compared with the winding so that the consequential thermal gradient gives high heat transfer from the winding. Cooling by water jackets surrounding the stator core is known. This is often useful when the machine is relatively long compared with its diameter: as the length/diameter ratio reduces, this method is less and less successful and alternative systems are used, for example, coolant pipes introduced into regions of the core and/or windings. Various attempts have been made to put this into practice, e.g. by providing coolant pipes around the winding overhang or through the core itself. FIG. 1 shows a prior art arrangement of a laminated stator 12, of the salient pole type having six poles 14 each surrounded by a coil 16. A rotor 15, mounted to rotate within the stator, has four salient poles 11. The coils on the stator have an overhang region 17 and coil sides 19. Coolant pipes 10 are placed at the ends of the stator core 12, in the plane of the laminations and adjacent to and encircling the winding overhang 17. Typically, these pipes are encapsulated with the winding overhang, but, even so, there is not a good thermal path between the portions of the winding and the slots of the stator and the coolant, since even the best encapsulating resins have a relatively high thermal resistance.

Another proposed method is to use liquid coolant passing through the winding conductors themselves. This technique is more applicable to large machines in the multi-megawatt range, where the great expense of the complex arrangements needed to provide both fluid seals and electrical insulation on the individual conductors is offset by the large saving in the running cost of the machine. Though this technique has been proposed for much smaller machines in very specialized applications, for example, as described in U.S. Pat. No. 5,489,810 (Ferreira), which is incorporated herein by reference, the saving has failed to justify the complexity.

Figure 2:
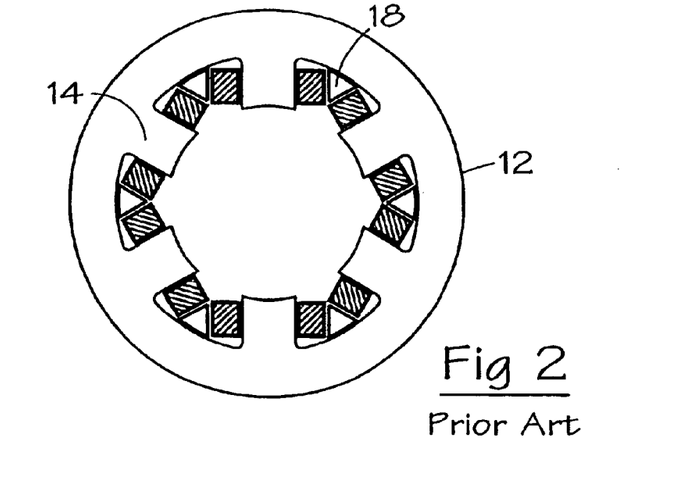
FIG. 2 is a prior art switched reluctance machine with cooling pipes.

An apparently simpler method would be to pass the coolant through paths which run down the slots in which the winding conductors lie. This is discussed in WO 00/01053 (Sjoberg), which is incorporated herein by reference. This has the advantage of short thermal paths from the winding to the coolant, but it requires electrically non-conducting coolant pipes (which generally also have poor thermal conductivity) and requires the reliably leak proof connection of many pipes to a coolant manifold in a restricted area. FIG. 2 shows a simplified view of this prior art arrangement, with triangular cooling pipes 18.

SUMMARY OF THE INVENTION

According to embodiments of the present invention there is provided an electrical machine comprising a winding mounted on a member of the machine, and at least one pre-formed heat-conducting insert having a first part in heat-conducting contact with the winding, and a second part in contact with a heat-dissipating part of the member.

The member may be the stator of an electrical machine on which a winding(s) is wound to energize stator poles. Alternatively, the member may be the moving part of the machine, such as a rotor in a rotary machine, on which a winding(s) is mounted.

The stator, for example, can be actively cooled by the use of one or more cooling pipes arranged around the periphery of the stator body defining the back iron. In this case, the second part of the insert is shaped to make heat-conducting contact with the pipe(s). Alternatively, the second part may be in contact with the body of the stator itself to dissipate the heat drawn by the insert from the winding.

One form of insert has a first part shaped to fill the space between adjacent coils of the winding. In a machine where the space is tapered, the first part is preferably wedge-shaped to fit the taper.

In another form, the insert has a first part that is shaped to lie on the axial end of a stator pole and the winding is placed over the first part so that there is an intimate contact for heat conduction from both the winding and the pole itself. In a stator, the surface of the back iron usually lies flush with the surface of the pole end. Thus, this type of insert preferably has a flat surface that is in contiguous contact with the pole end and the back iron.

When a cooling pipe is used, the second part of the insert can be formed to define a recess in conformity with the pipe section. When a plurality of inserts are present they can be connected by their second parts or arranged so that they form a substantially continuous channel for the pipe.

In one particular form of the invention there is provided a stator for an electrical machine defining a back iron part and a plurality of poles extending from the back iron, the poles having pole sides adjacent one another, a pole face and a pole end between the pole sides, a winding extending around the poles to define a winding overhang at the pole ends, and a pre-formed heat-conducting insert having a first part shaped to fit in heat-conducting contact with the winding overhang, and a second part arranged as a cross-piece to the first part which is in heat-conducting contact with the heat-dissipating part of the stator.

In another particular form of the invention, there is provided a stator for an electrical machine defining a back iron part and a plurality of poles extending from the back iron, a winding arranged in relation to the poles to define spaces between them, and a pre-formed heat-conducting insert having a first part shaped to fit in heat-conducting contact with the winding in the spaces, and a second part arranged as a cross-piece to the first part which is in heat-conducting contact with a heat-dissipating part of the stator.

BRIEF DESCRIPTION OF THE DRAWINGS

The invention can be put into practice in various ways, some of which will now be described by way of example with reference to the accompanying drawings in which.

DETAILED DESCRIPTION OF PREFERRED EMBODIMENTS

Figure 3:
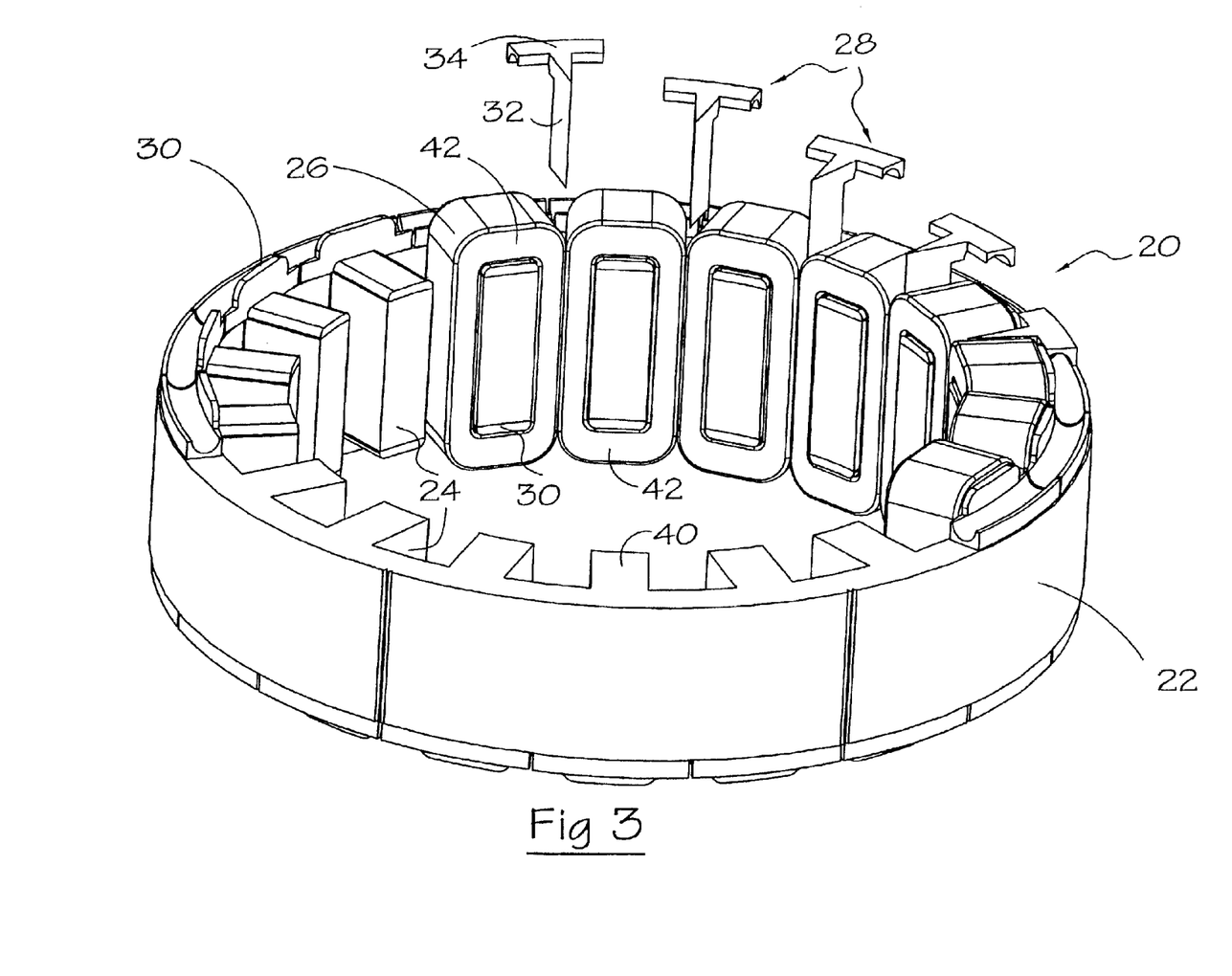
FIG. 3 illustrates a partially assembled stator in accordance with an embodiment of the invention.
Figure 4:
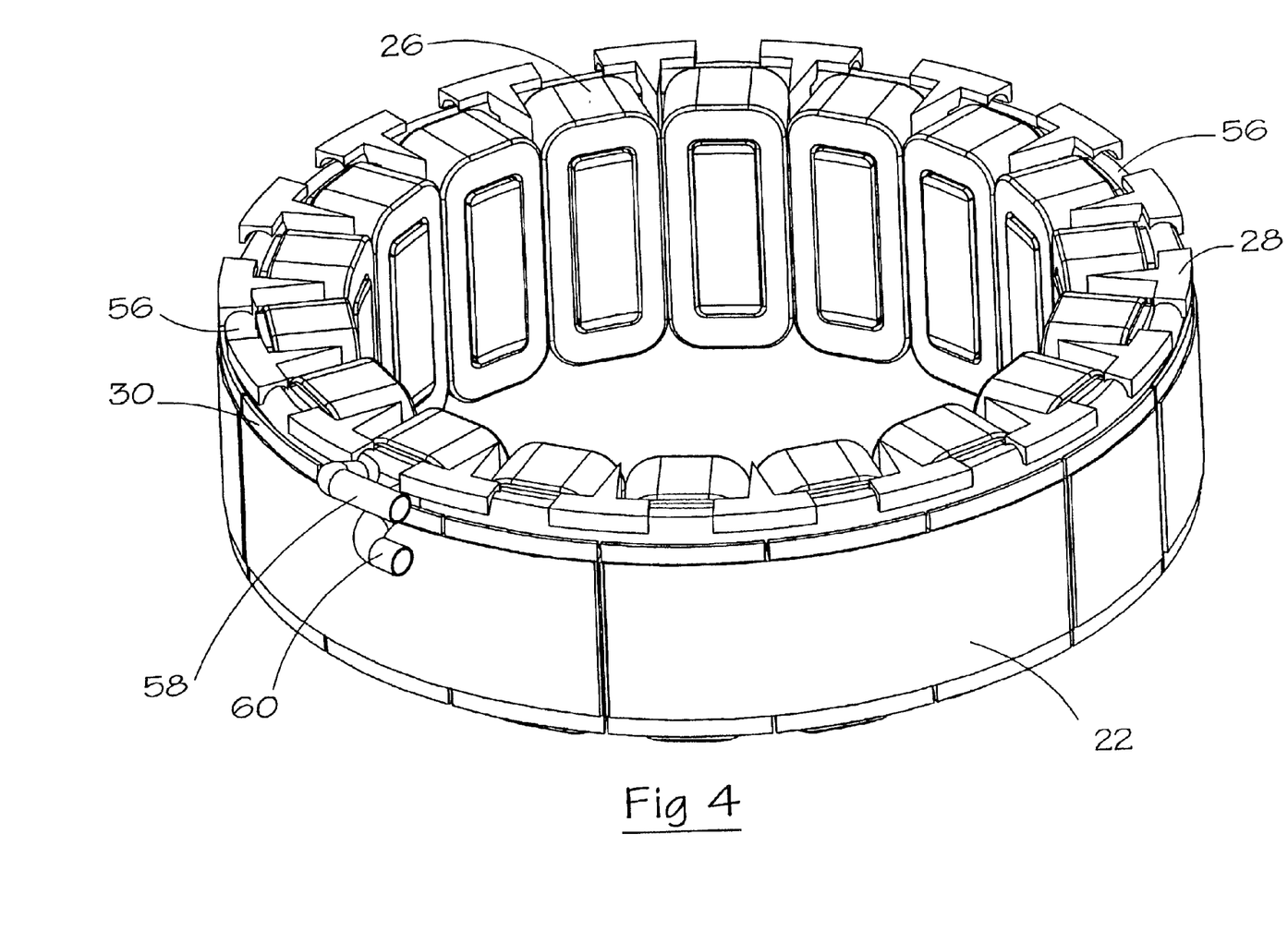
FIG. 4 shows the fully assembled stator of FIG. 3.

Referring to FIGS. 3 and 4, a stator for a reluctance machine comprises a stator body 20 which is made of a stack of laminations of a suitable magnetizable steel. The stator body comprises a back iron part 22 and a set of radially inwardly projecting stator poles 24. An energizing winding 26 is arranged around each individual pole 24. By connecting the windings together in energizable groups, a stator having a number of phases according to the number of groups is created. The connection of the windings into groups will depend on the type of motor that is being constructed. The options, and the types of rotor that can be used in conjunction with the various phase numbers will be well known to the person of ordinary skill in the art and will not be described in further detail here.

Figure 5A:
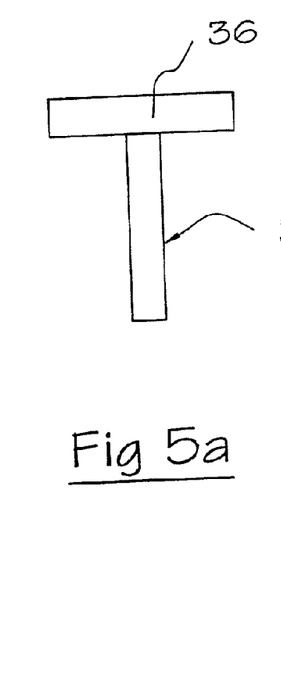
FIGS. 5a, 5b & 5c illustrate a heat-transfer insert from the stator of FIGS. 3 and 4.
Figure 5B:
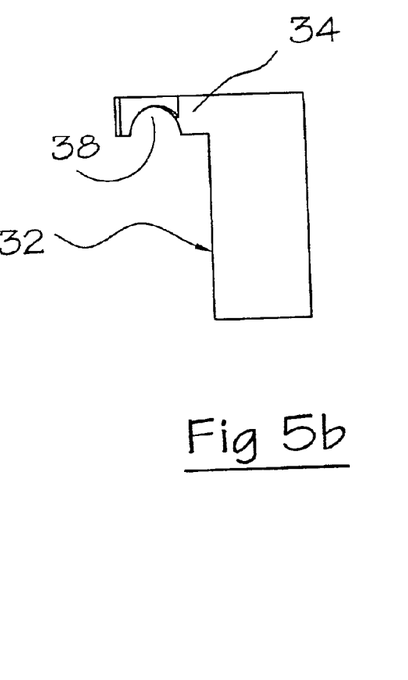
Figure 5C:
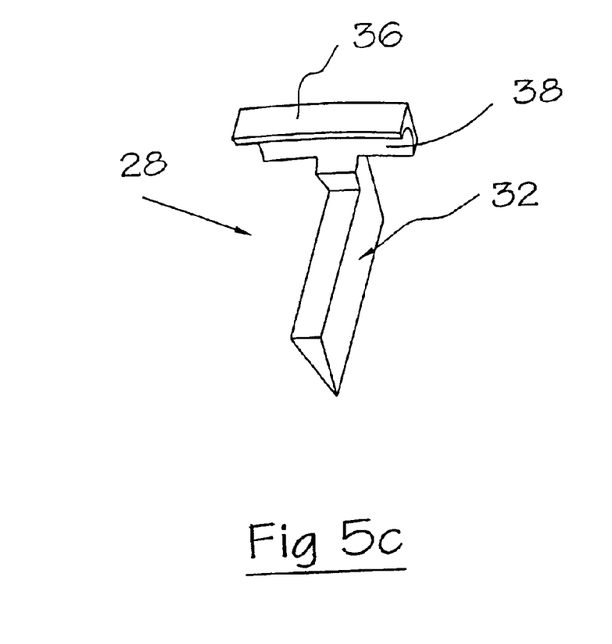
Figures 6A, 6B:
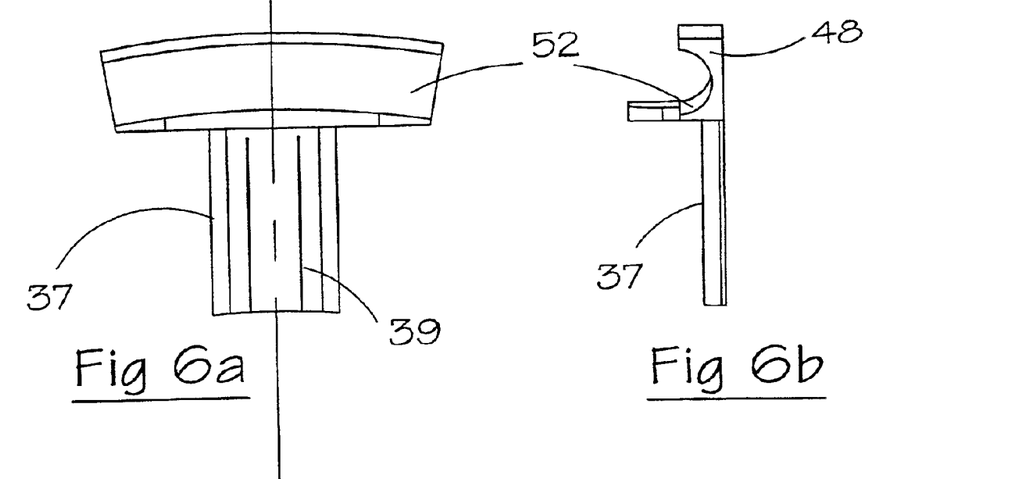
FIGS. 6a, 6b, 6c & 6d illustrate another heat-transfer insert from the stator of FIGS. 3 and 4.
Figures 6C, 6D:
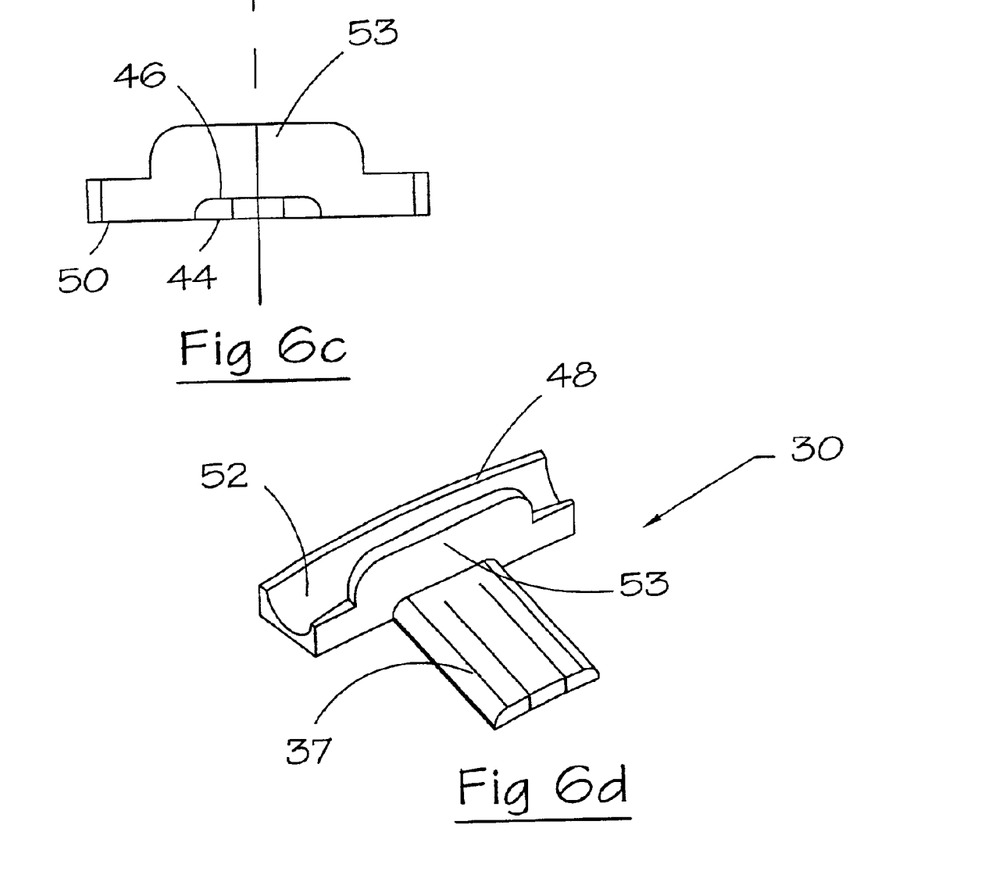

The stator includes winding inserts 28 and pole inserts 30. The winding inserts 28 are shown in more detail in FIGS. 5a–5c and comprise a first part 32, having a generally triangular lateral post section which conforms to the triangular gap between adjacent windings radially inward of the surface of the back iron 22 between stator poles 24. A second part 34 of the winding insert 28 comprises a cross-piece 36 (e.g. FIG. 5c) formed at one end of the first part 32, facing the back iron 22 of the stator 20. The cross piece 36 describes an arc along its length to coincide with the arc at the radius of the adjacent back iron 22. The lateral section of the cross-piece defines a recess 38 which, in this particular embodiment, is semi-circular. The primary function of the winding insert is to draw heat generated in the coil sides of the winding from the space between stator poles to an area where it can be more easily dissipated.

The pole inserts 30 are shown in more detail in FIGS. 6a–6d and comprise a first part 37 in the form of a tongue which sits on the axial end 40 of a stator pole 24 so that it is between an end face of the pole and an overhang 42 of the winding 26. An inner surface 44 of the tongue 37 is flat to conform to the flat surface of the end 40 of the stator pole. The other, outer, surface 46 of the tongue 37 has a flat middle region and radiused edges between the flat inner and outer surfaces. As with the winding insert 28, the outer surface 46 of the tongue 37 of the pole insert 30 is shaped to conform to the adjacent surface of the winding to maximize heat exchange from the winding in the same way that the flat engaging surfaces of the pole end 40 and the tongue 37 also encourage heat exchange. A second part 48 of the pole insert 30 is also formed as a cross-piece which has a flat surface 50 flush with the inner surface of the tongue so that it is arranged in contiguous contact with the flat surface of the outer lamination of the stator, defining both the stator pole and the stator body. An outer surface 52 of the cross-piece 48 defines an arcuate recess coincident with the same diameter described by the recesses 38 in the cross-pieces 36 of the winding insert 28. A flange 53 on the second part extends from its junction with the first part 37 so that it is in heat-conducting contact with an adjacent surface of the overhang 42. The primary function of the pole insert is to draw heat from the winding overhang and transfer it to another area where it may be dissipated.

When assembling first the pole inserts 30 to the stator, each is arranged on the pole end and the winding 26 is then placed tightly around it to ensure that there is intimate heat-conducting contact between the pole end 40 and the tongue 37, and also that the winding 26 conforms to the outer shape of the tongue 37. This could be done on a stator core formed from conventional, single-piece laminations. However, it is particularly applicable to segmented stators, in which lamination segments, each defining a single pole and the adjacent back-iron, are built up into a unit and wound before the segments are interconnected to form the stator assembly. Such an arrangement is disclosed in, for example, EP-A-0823771, which is incorporated herein by reference. By placing the pole insert on one or both ends of the stator segment and tightly winding the coil on to it, a very low thermal resistance is achieved for the heat-transfer path to the coolant pipes. After the winding of the stator is complete, the coolant pipe 56 or pipes are arranged in the circular recess in the cross-pieces of the pole inserts. It will be seen from FIG. 3 that the array of cross pieces of the pole inserts provides a substantially continuous channel of contact with the cooling pipe.

The first part 32 of the winding insert 28 is generally wedge-shaped to fit between the adjacent windings 26 in the stator. The main function of this winding insert is to extract heat from the coil sides in the slot and, in this embodiment, convey it to the coolant pipe or stator body. This insert 28 is assembled to the stator after the winding is completed and the coolant pipe 56 has been assembled, either to the stator body alone or in the recesses provided in the pole inserts 30. The first part of each winding insert is generally shaped to conform to the gap between adjacent windings. However, they should be a tight fit in the space in order to ensure sufficient heat-conducting contact with the windings and to push the coil sides against the pole sides, further aiding heat extraction. The cross pieces of the array of winding inserts shown in FIG. 4 clamp the cooling pipe in the continuous channel in the cross pieces of the pole inserts.

Cooling pipes can be provided at either axial end of the stator. In this case, the winding inserts are preferably in contact with the coil sides along approximately half the axial extent of the stator. If only one cooling pipe is provided, the contact length of the first part of each of the winding inserts extends preferably for most of, if not all of, the axial extent of the stator. In the case of either one cooling pipe or two, the or each pipe is connected to suitable cooling means. FIG. 4 shows the cooling pipe 56 terminated in couplings 58, 60 to which flexible hoses may be attached.

Corresponding pre-formed inserts can be arranged in relation to the windings on a rotor, where such a rotor is included in an electrical machine. The principles described above in relation to the stator of an electrical machine apply to such a rotor mutatis mutandis.

When the inserts and cooling pipes (if present) are assembled to the stator, the winding can be impregnated with resin in a known manner. This final impregnation further bonds the inserts to the winding and the pipes to facilitate further the heat transfer.

The inserts provide a highly heat-conductive path by which the effectiveness of the cooling system provided by the pipes is enhanced to draw heat directly from the windings through the material of the inserts. As best seen in FIG. 3, the pole inserts in this example define a continuous channel by their recesses, whereas the cross-pieces of the winding inserts are intermittent. It will be appreciated that either can be continuous or intermittent according to the span of the cross-pieces. For additional heat conduction, the cross-pieces can be clamped or otherwise secured to the stator to ensure an intimate contact between the two.

In an alternative embodiment, the heat-exchange function of the inserts is carried out by virtue of the heat-conducting contact of the inserts with the windings and the material of the stator body without the additional active cooling provided by the cooling pipes. In this case, the cross-pieces of the inserts do not have to define the recesses for the passage of the pipes.

Embodiments of the invention provide heat-transmitting members which thermally couple the winding to a heatsink in a more efficient way than previously. By using pre-formed inserts of an appropriate metal, such as aluminum, copper, magnesium, steel, bronze or another material of sufficient thermal conductivity, the heat is drawn more efficiently from the winding to the heat-dissipating part of the stator, such as the cooling pipe or the stator body itself. While metallic inserts have been disclosed, molded plastics inserts of a suitably thermally stable type could also be used, possibly, impregnated with a heat-conducting powder or particulate, such as a suitable metal.

The two forms of insert forming the heat-transmitting members can be used together or separately. When they are used separately, the inserts can be arranged to provide alternate upper and lower guides for a cooling pipe, or have a cooling pipe clipped into or onto an arrangement of recesses arranged facing all in the same direction. However, by alternating the two different types of insert, the maximal contact with the heat-dissipating stator body or the cooling pipe can be achieved by the interjacent overlapping arrangement.

The inserts may have a coating of insulating material applied to them to ensure that the insulation of the stator winding is not compromised by the use of the inserts.

Figure 7:
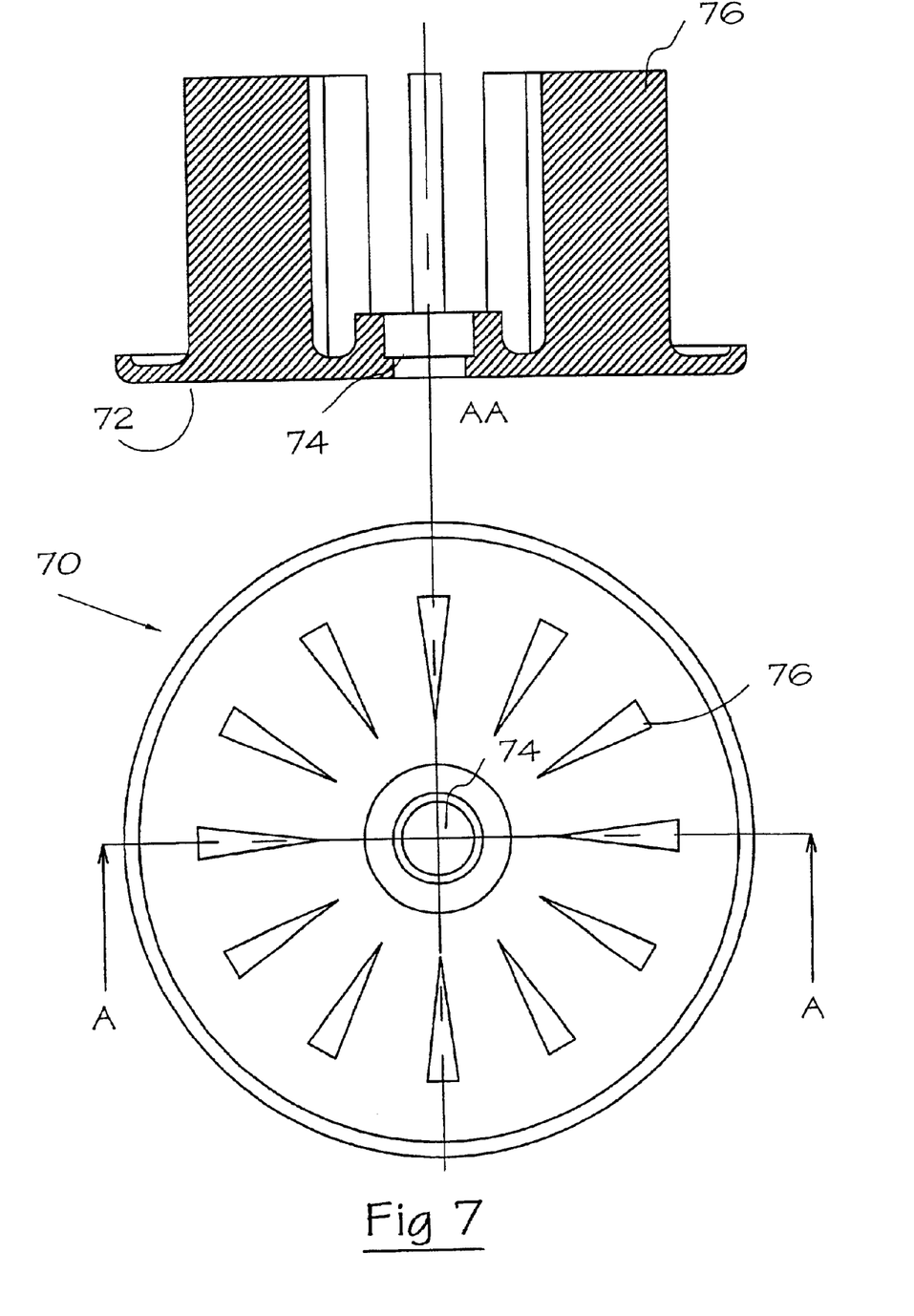
FIG. 7 illustrates an end shield for an electrical machine in accordance with an embodiment of the invention.

When the stator is not of the segmented type, the winding inserts and/or the pole inserts can be connected together by their cross-pieces as a single unit and arranged in the stator simultaneously. In a further embodiment of the invention, the winding inserts can be formed as a set of protrusions from one or more end shields of the machine. In FIG. 7, a set of inserts is an integral part of the casting which is used to close the end of the machine and locate a bearing for the rotor. The end shield 70 includes the twelve inserts 76 which fit down the coil sides as previously shown in FIGS. 3 and 4 in relation to the winding inserts 28. The inserts protrude from a base plate 72, which also carries a bearing housing 74. In this embodiment, the base plate 72 acts as a heat sink to dissipate the heat transferred from the winding by the inserts 76.

Figure 8:
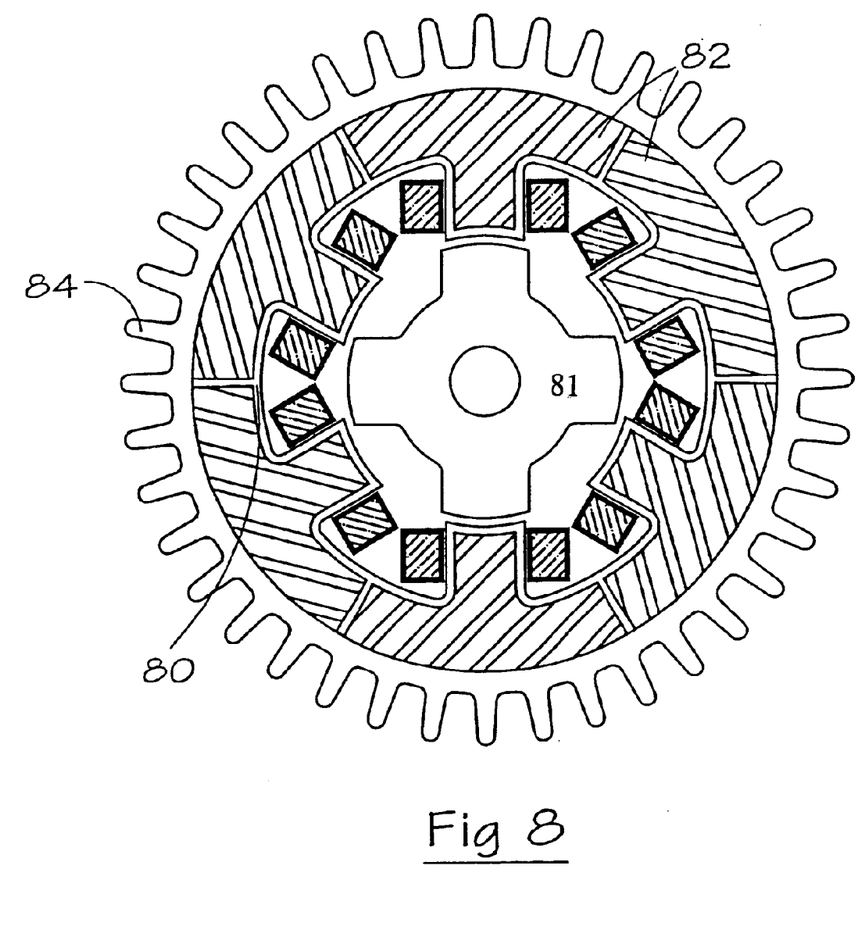
FIG. 8 illustrates a stator assembly for an electrical machine in accordance with an embodiment of the invention.

In a yet further embodiment, the pole inserts can be in thermal contact with a frame surrounding the laminated stator core. Preferably, the frame is finned to improve its heat-dissipating qualities. This is shown in FIG. 8, which shows a part cross-section of a machine with a 6-pole stator 80 and a rotor 81. The section is taken under the winding overhang and through the pole inserts. The outer ends of the pole inserts 82 are shaped to fit the inside of the frame 84 which surrounds the stator core. In this embodiment, the pole inserts transfer heat from the windings to the frame, from which the heat is dissipated.

It will be appreciated that, while the full benefits of the invention accrue when there is good thermal contact between the inserts and the windings, there will be some benefit even if the thermal contact is relatively poor, since the overall effect of the presence of the inserts is to provide lower thermal impedances. Hence it will be found that, for example, using inserts of sub-optimal length or shape will still be beneficial.

If the inserts are made from electrically conducting material, there may be a concern that there will be additional losses induced in the inserts because of eddy currents flowing in the inserts when the winding excitation is at a high frequency. These eddy currents can be reduced according to conventional electromagnetic practice by incorporating slits in the appropriate regions of the inserts, for example as shown by slits 39 in e.g. FIG. 6a.

Figure 9:
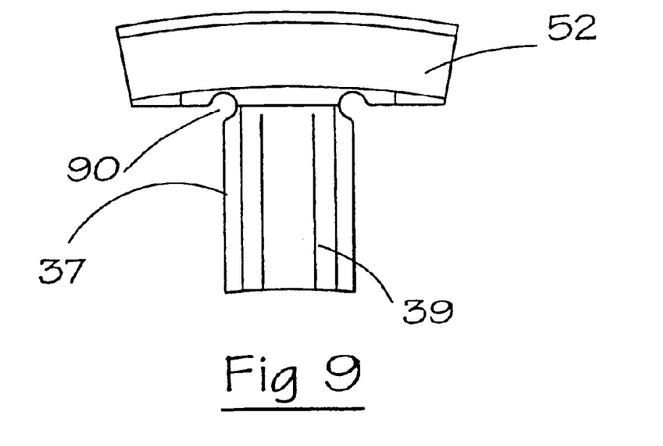
FIG. 9 illustrates a further embodiment of a heat-transfer insert according to an embodiment of the invention.

Other features can be added to the profile of the insert to avoid any difficulties of insulating the insert from the winding. For example, it is well-known in the art to use a piece of insulating sheet material folded into a generally U-shaped form to provide a slot liner around the interpolar gap to insulate the coils from the poles. It is well-known that the corners of the U-shape are problem areas at the ends of the stator, where the material is likely to tear when it is forced to bend in two planes. To avoid exacerbating this problem, and indeed to ameliorate it partly, features may be added to the profile of the pole insert. For example, FIG. 9 shows notches 90 added to the pole insert to allow the slot liner to bend more easily during assembly of the winding to the stator.

Embodiments of the invention are also equally applicable to linear machines and to inverted machines, in which the rotor is arranged on the outside of the stator. They apply equally to machines operated as motors or generators.

It will be apparent to the person of ordinary skill in the art that variations and modifications can be made without departing from the invention. Accordingly, the above description of embodiments is made by way of example and not for the purposes of limitation. The present invention is intended to be limited only by the spirit and scope of the following claims.

What is claimed is:

1. An electrical machine, comprising:

a stator;

a rotor adapted for rotation with respect to the stator;

a plurality of electrical windings operably coupled with the rotor and the stator;

a cooling pipe adapted to dissipate heat generated by the windings;

a plurality of first heat-conducting inserts adapted to transfer heat generated by the windings, the first heat-conducting inserts each defining a first arc for accommodating a portion of the cooling pipe; and a plurality of second heat-conducing inserts adapted to transfer heal generated by the windings, the second heat-conducting inserts each defining a second arc for accommodating a portion of the cooling pipe;

wherein the first heat-conducting inserts and the second heat-conducting inserts are separate pieces adapted for contact with ouch other such that the first arc and the second arc together form a recess;

further wherein the cooling pipe is disposed within the recess.

2. An electrical machine as claimed in claim 1, wherein the cooling pipe defines a generally circular cross section; further wherein the first arc and the second arc together define a generally circular cross section corresponding to the generally circular cross section of the cooling pipe.

3. An electrical machine as claimed in claim 2, wherein the stator defines stator poles; further wherein the first heat-conducting inserts are at least partially disposed between adjacent windings of the electrical machine; further wherein the second heat-conducting inserts are at least partially disposed at ends of the stator poles.

4. An electrical machine as claimed in claim 1, wherein the first heat-conducting inserts are winding inserts disposed between adjacent windings.

5. An electrical machine as claimed in claim 4, wherein the winding inserts each define a generally triangular post section conforming to a generally triangular gap between adjacent windings.

6. An electrical machine as claimed in claim 5, wherein the winding inserts each define a cross piece formed at one end of the generally triangular post section, further wherein the cross piece defines the first arc.

7. An electrical machine as claimed in claim 1, wherein the stator comprises a plurality of stator poles; further wherein the second heat-conducing inserts are pole inserts adapted for contact with the stator poles.

8. An electrical machine as claimed in claim 7, wherein the pole inserts each define a tongue adapted to generally conform to an end of a respective stator pole and to generally conform to a surface of a respective winding corresponding to a respective Stator pole.

9. An electrical machine as claimed in claim 8, wherein the pole inserts each define a cross piece formed at one end of the tongue; further wherein the cross piece defines the second arc.

10. An electrical machine as claimed in claim 9, wherein the cross piece of each pole insert is disposed in contact with a back iron part of the electrical machine.

11. An electrical machine as claimed in claim 9, wherein the first heat-conducting inserts are winding inserts disposed between adjacent windings, further wherein the winding inserts each define a post section generally conforming to a gap between adjacent windings; further wherein the winding inserts each define a cross piece formed at one end of the post section, the winding insert cross piece defining the first arc.

* * * * *